United States Patent Office 3,726,885
Patented Apr. 10, 1973

3,726,885
NITROSO-SUBSTITUTED ESTERS OF
FLUOROCARBON ACIDS
Ward H. Oliver, Mobile, Ala., and Calvin D. Padgett, Waldo, and Eugene C. Stump, Jr., Gainesville, Fla., assignors to PCR, Inc., Gainesville, Fla.
No Drawing. Application May 2, 1968, Ser. No. 726,203, which is a continuation-in-part of abandoned application Ser. No. 586,664, Oct. 14, 1966. Divided and this application Sept. 1, 1970, Ser. No. 68,779
Int. Cl. C07c 93/02
U.S. Cl. 260—482 P
3 Claims

ABSTRACT OF THE DISCLOSURE

Compounds of the formulas

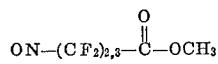

and

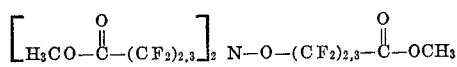

are produced by reacting methyl nitrite and perfluoroglutaric anhydride or perfluorosuccinic anhydride and then decarboxylating the resultant product. The compounds, which can be hydrolyzed to produce the corresponding nitroso-substituted fluorocarbon acids, are used as comonomers in nitroso rubbers.

REFERENCE TO RELATED APPLICATIONS

This application is a division of Ser. No. 726,203, filed May 2, 1968, now U.S. Pat. No. 3,554,885, which is a continuation-in-part of Ser. No. 586,664, filed Oct. 14, 1966, now abandoned.

BACKGROUND OF THE INVENTION

Perfluorinated organic nitroso compounds have been known in the prior art. It has been suggested that nitrosoalkanes may be made by reacting a fluorine-containing anhydride with a nitrosyl halide to produce the corresponding fluorinated acyl nitrite, which may be subsequently converted by decarboxylation to the corresponding nitrosoalkane. It has also been suggested to produce the fluorinated acyl nitrite by reacting a fluorine-containing acid salt of a metal with a nitrosyl halide, and thereafter converting to the corresponding nitrosoalkane by decarboxylation.

British patent specification 1,014,221 discloses a process for producing perfluorinated acyl nitrites in almost quantitative yield by reacting a metal perfluorocarboxylate with a nitrosyl halide. The acyl nitrites so produced may be either pyrolyzed or subjected to photochemical decarboxylation to produce perfluoroalkyl-nitroso compounds.

Hazeldine U.S. Pat. No. 3,083,237, issued Mar. 26, 1963, discloses a process for producing fluorinated nitroso compounds by reacting a fluorine-containing organic bromide with nitric oxide. The fluorinated nitroso compounds so produced may be polymerized with fluoroalkenes and fluorodienes to form useful copolymers.

Crawford et al., U.S. Pat. No. 3,192,246, issued June 29, 1965, discloses a process for producing a halogen-containing alkyl nitrite by reacting an aliphatic anhydride containing fluorine or other halogen atoms with a nitrogen sesquioxide ($N_2O_3$). Crawford et al. disclose that the nitrosoalkanes formed by their processes are useful as copolymers with tetrafluoroethylene to produce useful plastic or elastomeric copolymers. Specifically, the copolymer of trifluoronitrosomethane and tetrafluoroethylene is a nitroso rubber with good low temperature flexibility and excellent solvent resistance.

The Crawford et al. U.S. Pat. No. 3,162,692, issued Dec. 22, 1964, discusses problems involved with the known decarboxylation processes for converting fluorinated acyl nitrites to the corresponding nitrosoalkanes. The patentees state that both pyrolysis and photolytic decarboxylation processes have not been satisfactory, and disclose a process wherein trifluoroacetyl nitrite is decarboxylated in the presence of a refluxing inert solvent at a pressure sufficient to maintain the trifluoroacetyl nitrite in the liquid phase at the decarboxylation temperature (the prior art pyrolysis was carried out in the vapor phase).

The Park et al. U.S. Pat. No. 3,160,669, issued Dec. 8, 1964, discloses a process for producing polyfluorinated nitroso acylates by reacting nitrosyl halide with anhydrides of polyfluorinated organic acids.

The Crawford et al. Pat. No. 3,192,260, issued June 29, 1965, discloses the preparation of omega nitroso perfluoropropionic acid, of the structure: $HO_2CCF_2CF_2NO$ and also omega nitroso perfluorobutyric acid. In both cases, the acid is produced by hydrolyzing omega nitroso perfluoroacyl nitrite.

SUMMARY OF THE INVENTION

Methyl nitrite will react with perfluoroglutaric anhydride or perfluorosuccinic anhydride to give essentially quantitative yields of the corresponding nitrite-ester. The nitrite-ester can be decarboxylated to give new nitroso monomers which contain an ester group. This ester group is of special interest, as the nitroso-substituted esters can be copolymerized or terpolymerized to produce a nitroso rubber which will have pendent ester groups, which provide sites for subsequent cross-linking, or curing, of the nitroso rubber polymer. The nitroso-ester process produces the corresponding tri-ester as a by-product.

In addition, the nitroso-substituted esters of fluorocarbon acids may be hydrolyzed to produce the corresponding nitroso substituted fluorocarbon acids.

DESCRIPTION OF THE INVENTION

Methyl nitrite will react with perfluoroglutaric anhydride or perfluorosuccinic anhydride by the following equation:

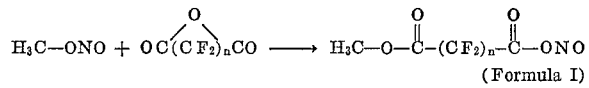

(Formula I)

wherein $n$ is 2 or 3.

The nitrite-ester can be decarboxylated to form the nitroso-substituted ester (whereinafter sometimes called "nitroso ester") by the following reaction:

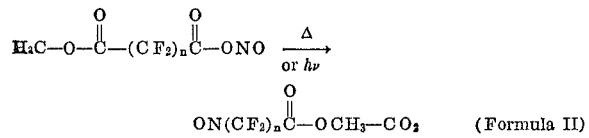

(Formula II)

The nitroso-substituted esters of fluorocarbon acids produced by the reaction of Formula II are useful monomers for the preparation of nitroso rubbers. The nitroso-substituted ester can be copolymerized with fluorine-containing olefins, or may be terpolymerized with fluorine-containing olefins and perfluoro or chlorofluoro nitrosoalkanes. An example of a suitable fluorine-containing olefin is tetrafluoroethylene, and trifluoronitrosomethane can be mentioned as an example of the fluorinated nitrosoalkanes. The monomers polymerize readily at temperatures of $-30°$ C. to $-40°$ C., without requiring the use of a catalyst. This polymerization is described in the copending application of Ward H. Oliver and Eugene C. Stump, Jr., filed Oct. 14, 1966, entitled "Nitroso Rubber Polymers Containing Nitroso-Substituted Esters of Fluorocarbon Acids," S.N. 586,677, now U.S. Pat. No.

3,472,822, the disclosure of which is hereby incorporated by reference.

The methyl nitrite will react with the anhydrides at temperatures from about −20° C. up to elevated temperatures, with the liberation of exothermic heating, without requiring the presence of a catalyst. The reactants can be condensed in a closed tube or the gaseous nitrite can be passed through liquid anhydride, for example. Generally, it is preferred that the reaction temperature be below the boiling point of the anhydride, and most preferably the reaction temperature is within the range of about 20° C. to about 50° C. Although the methyl nitrite and the anhydride are preferably mixed in equal molar amounts, the scope of the present invention contemplates a reaction of a mixture which may contain from 30–70 mole percent of methyl nitrite and 70 to 30 mole percent of the anhydride.

The methyl nitrite and the anhydride are mixed together, preferably by condensing into a reaction vessel, at reduced temperatures, e.g., −78 to −196° C., and thereafter brought to a temperature at which the materials react, e.g., room temperature or 20 to 50° C. The pressure for this reaction may be, for example, in the range of 400 mm. Hg to 10 atmospheres. Generally, the reaction will proceed under autogenous pressure.

The reaction products of methyl nitrite with perfluoroglutaric anhydride and perfluorosuccinic anhydride have been identified by infrared, NMR, and elemental analysis. The infrared spectrum shows, for each compound, typical methyl, nitrite, and ester absorption, as well as strong C-F absorption. The glutarate was pyrolyzed under total vacuum at 200–250° C. Trap-to-trap distillation of the resulting blue product gave $CH_3O_2C(CF_2)_3NO$ which was essentially pure, in a yield of about 47%. The infrared spectrum of this product showed typical methyl, ester and nitroso absorption. The NMR spectrum, using acetaldehyde and trifluoroacetic acid as references, is shown below:

| Peak | Chemical shift | Pattern | Rel. area | Assignment |
|---|---|---|---|---|
| H | 6.88 tau | Singlet | | $CH_3O$ |
| F-A | +38.9 p.p.m | $A_2B_2$ pattern | 7.3 | End $CF_2$'s. |
| F-B | +42.9 p.p.m | | 7.2 | |
| F-C | +48.9 p.p.m | Singlet | 7.1 | Middle $CF_2$. |

Similarly, the succinate was pyrolyzed and the resulting blue product purified. Reduced conversions or yields, in the order of about 20%, were obtained with this compound. The low yield is partially due to the formation of a colorless liquid, subsequently identified as the triester, which was formed and removed during the pyrolysis. The infrared spectrum showed the characteristic peaks expected for $CH_3O_2C(CF_2)_2NO$. The NMR spectrum was obtained as shown below:

| Peak | Chemical shift | Pattern | Rel. area | Assignment |
|---|---|---|---|---|
| H | 6.83 tau | Singlet | | $CH_3O$ |
| F-A | +40.2 p.p.m | Barely resolvable doublet | 5.7 | $CF_2$ |
| F-B | +43.3 p.p.m | do | 5.8 | $CF_2$ |

The decarboxylation process can be by pyrolysis at temperatures of about 150 to about 350 degrees C., preferably 150 to 250° C., or by photolysis by ultraviolet light. A Hanovia lamp 8A36 may be used to provide the sources of ultraviolet rays. Pyrolysis temperatures about 300° C. generally result in some decomposition of the materials, especially at temperatures above 350° C. Temperatures below 150° C. are generally too low for acceptable rates of decarboxylation. The decarboxylation process may be at reduced pressures up to a pressure of 1 atmosphere, e.g. from about .01 to about 760 mm. Hg. Low pressures are preferred for the decarboxylation step, e.g., .01 to 5 mm. Hg. Pyrolysis may be carried out in any of several different ways; e.g. by dropping the nitrite into a heated column from the top, or into a heated pot at the bottom, and thereafter trapping the product in a cold trap.

One by-product of the preparation of nitroso-substituted methyl ester of perfluorobutyric acid is a triester which has the following structural formula:

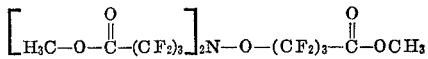

as identified by NMR and elemental analysis. The NMR spectrum using tetramethylsilane and trifluoroacetic acid as references, is as follows:

| Designation | Chemical shift | Pattern and splitting | Rel. area | Assignment |
|---|---|---|---|---|
| H | 6.22 tau | Sharp singlet | | $-OCH_3$ |
| F-A | +10.2 p.p.m. | Broad | 2.6 | $-CF_2O$ |
| B, C | +17.2 | Non-equiv. quartet, broad | 4.7 | $-CF_2N$ |
| D | +41.2 | Broad, overlaping peaks | 9.0 | $-CF_2CO_2$ |
| E | +43.5 | Broad | 5.1 | $-CF_2-$ |
| F | +47.8 | do | 2.5 | $-CF_2-$ |

A similar triester of the formula:

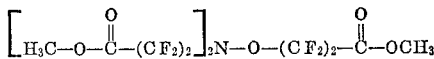

is obtained as a by-product in the preparation of the nitroso-substituted methyl ester of perfluoropropionic acid.

These triesters can be conventionally converted by way of a triamide into a trinitrile which is useful as a cross-linking agent, e.g., for polyamides, or as an intermediate in the production of triazine compounds. The triesters are produced in about the same relative proportions as the nitroso-substituted perfluorocarboxylic acid ester, e.g., in an amount of about 20–25 percent, in the decarboxylation process, either pyrolysis or photolysis.

The compounds of the present invention have the generic formula:

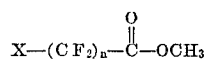

wherein $n$ is 2 or 3 and X is $-NO$ or

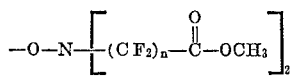

provided that, in the case of the triester, all $n$'s are the same.

The nitroso-substituted esters of the present invention can be converted into the corresponding nitroso-substituted acids by conventional hydrolysis procedures whereby the acids produced are of high purity. Such acids may be utilized to produce nitroso rubber terpolymers, as disclosed in the Crawford et al. Pat. 3,192,260. It is difficult to obtain the acid in high purity by the prior art methods. While this nitroso-substituted acid product is not unique, the present process is a novel means of producing such a product. Thus, the present invention also contemplates a novel process for producing nitroso-substituted fluorocarbon acids, by hydrolyzing the nitroso-substituted esters of fluorocarbon acids. The hydrolysis may be under neutral or acidic conditions, but basic conditions should be avoided. The nitroso esters may be stirred into water at room temperature and after about 5 days the nitroso esters will be converted into the nitroso-substituted fluorocarbon acid. The nitroso ester is insoluble in water but the insoluble phase gradually disappears, as the soluble acid is formed by hydrolysis. The acid may be recovered from solution, for example, by salting out with an excess of sodium chloride or by extracting with ethyl acetate or methylene chloride. The hydrolysis reaction proceeds faster at elevated temperatures, e.g., 95 to 100° C. although it may be conducted at lower temperature, e.g., 50° C.

Alternatively, the nitroso ester may be hydrolyzed by using an acid, e.g., concentrated sulphuric acid, to effect the hydrolysis. In general, the nitroso ester is hydrolyzed by contacting the same with water containing from 0 to about 98% by weight of a strong mineral acid, such as sulfuric acid, at a temperature of about 5° C. to about 100° C., preferably about 25° C. to about 50° C. until the hydrolysis reaction is complete.

The invention will be understood more readily by reference to the following examples; however, these examples are intended to illustrate the invention and are not to be construed to limit the scope of the invention.

EXAMPLE I

Preparation of starting compounds (a) Preparation of methyl nitrite.—Methanol (32 g., 1 mole) was dissolved in an equal volume of water and added to a flask containing $NaNO_2$ (70 g.). The mixture was stirred and conc. $H_2SO_4$ slowly added. The evolved gas was passed through a $CaCl_2$ tube and collected in a trap cooled in liquid air. The product (57 g., 93% yield) was condensed into a cylinder.

(b) Preparation of perfluoroglutaric anhydride.—Perfluoroglutaryl chloride (910 g., 3.3 moles) was slowly added with stirring to 150 ml. water in a 3-l. flask. After the acid chloride had been added, the water was removed by azeotroping with benzene. The benzene was distilled off at atmospheric pressure, then by aspirator. Excess $P_2O_5$ was then mixed thoroughly with the perfluoroglutaric acid and heated. The anhydride was collected (600 g., 83% yield) directly by distillation.

(c) Preparation of perfluorosuccinic anhydride.—Perfluorosuccinic acid (200 g., 1.05 moles) was mixed with excess $P_2O_5$ in a 1-l. flask. The mixture was heated and perfluorosuccinic anhydride (141 g., 0.82 mole) was removed by distillation as formed.

EXAMPLE II

Preparation of $CH_3O_2C(CF_2)_3COONO$

Methyl nitrite (12.2 g., 0.2 mole)) and perfluoroglutaric anhydride (44.4 g., 0.2 mole) were condensed into a Fischer-Porter tube and allowed to come to room temperature. The tube was shaken sufficiently to insure complete mixing. The tube soon became warm and cooled again after about 1½ hours. The color became amber. Unreacted starting material was removed at reduced pressure; yield was practically quantitative.

*Analysis.*—Calcd. for $C_6H_3F_6NO_5$ (percent): C, 25.44; H, 1.06; F, 40.28. Found (percent): C, 25.70; H, 1.28; F, 40.53.

EXAMPLE III

Preparation of $CH_3O_2C(CF_2)_3NO$

The product produced by Example II was decarboxylated by the following procedure:

A 250 ml., 2-neck flask was fitted with an addition funnel containing $CH_3O_2C(CF_2)_3COONO$ (33.0 g., 0.116 moles) and a 15" Vigreux column vented to a vacuum system through a trap cooled to −183° C. A complete vacuum (less than 0.1 mm. Hg) was maintained throughout the system as the nitrite was dropped into the flask which was heated to 200°. The column was heated to 250° C. After the pyrolysis was completed, the material in the −183° C. trap was allowed to warm to room temperature, the nitrogen oxides were removed under vacuum, and the blue liquid residue was washed with water. The blue product was separated and distilled twice by boiling from one trap to another under vacuum, discarding the last several ml. of liquid each time. A GLC of the final product showed it to be 100% pure. The deep blue liquid product obtained weighed 13.0 g. This represents a 47% yield of $CH_3O_2C(CF_2)_3NO$.

*Analysis.*—Calcd. for $C_5H_3F_6NO_3$ (percent): C, 25.11; H, 1.26; F, 47.67. Found (percent): C, 25.3; H, 1.17; F, 47.7.

EXAMPLE IV

The product produced by Example II was decarboxylated in a manner similar to Example 3 except that the decarboxylation reaction was at atmospheric pressure. A lower yield of the nitroso-substituted ester was obtained than reported for Example III.

EXAMPLE V

Preparation of $CH_3O_2C(CF_2)_2COONO$

Methyl nitrite (12.2 grams, 0.2 mole) and perfluorosuccinic anhydride (34.2 grams, 0.2 mole) were reacted following the procedure for Example II with similar results.

*Analysis.*—Calcd. for $C_5H_3F_4NO_5$ (percent): C, 25.76; H, 1.29; F, 32.60. Found (percent): C, 25.84; H, 1.33; F, 36.91.

EXAMPLE VI

Preparation of $CH_3O_2C(CF_2)_2NO$

A 250 ml., 2-neck flask was fitted with an addition funnel containing $CH_3O_2C(CF_2)_2COONO$ (52 g., 0.223 mole) and a 15" Vigreux column which was fitted with an air-cooled condenser constructed on the order of a Dean-Stark apparatus. The condenser was vented to a vacuum system through a −183° C. trap, and a total vacuum was maintained throughout the system as the nitrite was dropped into the flask which was heated to 200° C. The Vigreux column was heated to 250° C. After the pyrolysis had been going for several minutes, a blue product collected in the −183° C. trap and a colorless liquid began to condense in the air-cooled condenser. This liquid was periodically removed. The −183° C. trap was allowed to warm to room temperature and the remaining liquid product was washed with water. The blue product was separated and distilled twice by distilling from one trap to another under vacuum, discarding the last several ml. of liquid each time. A GLC of the final product showed it to be 100% pure. An infrared spectrum was made of this deep blue liquid which weighed 8.3 g. This represents a 20% yield of $CH_3O_2C(CF_2)_2NO$.

*Analysis.*—Calcd. for $C_4H_3F_4NO_3$ (percent): C, 25.40; H, 1.60; F, 40.21. Found (percent): C, 25.66; H, 1.72; F, 40.42.

EXAMPLE VII

Preparation of

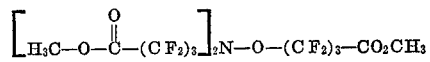

Pyrolysis of the nitrite ester, as set forth in Example III, gives a higher boiling, clear fraction in addition to the blue nitroso ester. This material is a triester resulting from radical combination. The higher boiling material (B.P.∼137–140° C. at 0.1 mm. Hg) is formed in about the same conversion (21–24%) as the nitroso ester. An infrared spectrum shows typical ester absorption as well as C–H absorption. Pyrolysis at higher temperatures (350°–400°) results in the formation of a high-boiling purple liquid, possibly a nitroxide. Photolysis of the nitrite ester gives, in addition to higher boilers, by-products which apparently contain a nitro group.

EXAMPLE VIII

Photolytic decarboxylation

Decarboxylation of $CH_3O_2C(CF_2)_3COONO$ was effected with UV light. The nitrite (40 g.) was placed into a liter flask (equipped with an immersion well and No. 8A36 Hanovia lamp) which was connected to a vacuum system through a $-195°$ trap. Irradiation was continued for 48 hrs. while a 0.1 mm. pressure was maintained. Combining the blue product of a similar reaction using 33 g. of nitrite gave 12 g. fractionated

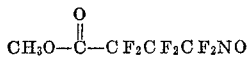

(20%). Another product having a green color was indicated by infrared analysis to be a nitro compound.

EXAMPLE IX

Hydrolysis of $CH_3O_2C(CF_2)_3NO$ $CH_3O_2C(CF_2)_3NO$ (15 g.) was placed into 100 ml. of water and stirred at room temperature. The amount of insoluble ester gradually decreased and the solution turned blue due to the dissolved nitroso-acid. When complete hydrolysis had occurred (5 days), the solution was saturated with sodium chloride, causing a blue liquid, identified as $HOOC(CF_2)_3NO$, to separate. The nitroso-acid was dried with anhydrous sodium sulfate to give 12 g. of $HOOC(CF_2)_3NO$. An infrared spectrum of this compound exhibits typical nitroso and carboxylic acid absorption peaks.

EXAMPLE X

Preparation of

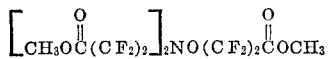

Pyrolysis of the nitrite ester, as set forth in Example VI, gives a higher boiling, colorless material in addition to the blue nitroso ester. This material was identified as the triester $[CH_3O_2C(CF_2)_2]_2NO(CF_2)_2CO_2CH_3$ by elemental, infrared, and NMR analysis.

*Analysis.*—Calcd. for $C_{12}H_9F_{12}NO_7$ (percent): C, 28.40; H, 1.78; F, 45.00; N, 2.76. Found (percent): C, 28.52; H, 1.99; F, 45.03; N, 3.98.

The infrared spectrum of the liquid exhibited distinctive peaks at 3.37, 5.60, 6.91, 7.50, 8.32, 8.75, 9.62, and 9.80 microns.

The NMR spectrum using acetaldehyde and trifluoroacetic acid as references is as follows:

| Designation | Chemical shift | Pattern and splitting | Rel. area | Assignment |
|---|---|---|---|---|
| H | 6.24 tau | Singlet | | $-OCH_3$ |
| F-A | +12.7 | Broad | 8.00 | $-CF_2O-$ |
| B | +19.8 p.p.m | Doublet | 16.00 | $-CF_2N-$ $\parallel$ O |
| C | +39.5 p.p.m | Broad | 19.9 | $-CF_2C-$ |
| D | +43.1 p.p.m | do | 19.3 | Same. |

Obviously many modifications and variations of the present invention are possible in the light of the above teachings. It is, therefore, to be understood that within the scope of the appended claims, the invention may be practiced otherwise than as specifically described.

What is claimed is:

1. Compounds of the formula: $X-(CF_2)_n-CO_2CH_3$ wherein $n$ is 2 or 3 and X is

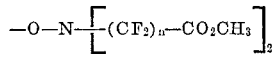

2. The compound of claim 1 wherein the compound

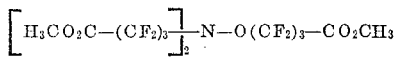

3. The compound of claim 1 wherein the compound

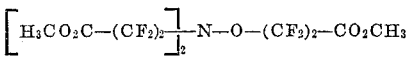

References Cited

UNITED STATES PATENTS 3,192,260   6/1965   Crawford et al. _____ 260—453

OTHER REFERENCES

Strom et al., Chem. Comm. No. 4 (Feb. 23, 1966), pp. 115, 116.

Dyatkin et al., Chem. Abstracts, vol. 64 (1966), (effective date Feb. 16, 1966), p. 11080.

JAMES A. PATTEN, Primary Examiner

U.S. Cl. X.R.

204—158 R; 260—345.1, 346.8, 478, 534